US010777332B2

(12) United States Patent
Liou et al.

(10) Patent No.: US 10,777,332 B2
(45) Date of Patent: Sep. 15, 2020

(54) ELECTRODE THIN FILM AND METHOD FOR MANUFACTURING THE SAME

(71) Applicant: NATIONAL TSING HUA UNIVERSITY, Hsinchu (TW)

(72) Inventors: Tong-Miin Liou, Hsinchu (TW); Chien-Chong Hong, Hsinchu (TW); Yan-Ren Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 265 days.

(21) Appl. No.: 15/784,182

(22) Filed: Oct. 15, 2017

(65) Prior Publication Data
US 2018/0261353 A1 Sep. 13, 2018

(30) Foreign Application Priority Data
Mar. 7, 2017 (TW) .............................. 106107394 A

(51) Int. Cl.
H01B 1/02 (2006.01)
H01B 13/00 (2006.01)
(Continued)

(52) U.S. Cl.
CPC .................. H01B 1/02 (2013.01); B05D 1/28 (2013.01); B32B 15/04 (2013.01); G06F 3/044 (2013.01);
(Continued)

(58) Field of Classification Search
CPC ........ H01B 1/02; H01B 13/0036; B05D 1/28; B05D 3/0218; B05D 3/10; B05D 3/12; B05D 5/12; B05D 7/52; B32B 15/04; B32B 2255/205; G06F 3/0412; G06F 3/0416; G06F 3/044; G06F 2203/04; H01M 4/0402; H01M 4/0409; H01M 4/0435; H01M 4/30; H01M 4/54; H01M 4/8896
(Continued)

(56) References Cited

U.S. PATENT DOCUMENTS 6,432,585 B1 * 8/2002 Kawakami .............. C23C 18/31
429/233
8,337,947 B2 * 12/2012 Camorani ............. B28B 11/001
427/197
(Continued)

FOREIGN PATENT DOCUMENTS

KR 2005074193 * 7/2005

Primary Examiner — Brian K Talbot
(74) Attorney, Agent, or Firm — CKC & Partners Co., LLC

(57) ABSTRACT

The present invention proposes an electrode thin film and a method for manufacturing the electrode thin film. The method includes: determining a height between a first roller and a substrate and a coating speed for the first roller coating a first metal nanowire suspension liquid onto the substrate based on a suspension property of the first metal nanowire suspension liquid; coating, by using the first roller, the first metal nanowire suspension liquid onto the substrate with the coating speed to form a wetting film on the substrate; and controlling a first temperature of the substrate heating the wetting film based on the suspension property of the first metal nanowire suspension liquid to dry the wetting film as the electrode thin film. The first temperature makes a dewetting speed of the wetting film higher than a drying speed of the wetting film.

8 Claims, 18 Drawing Sheets

(51) Int. Cl.
*B05D 1/28* (2006.01)
*B32B 15/04* (2006.01)
*G06F 3/041* (2006.01)
*G06F 3/044* (2006.01)
*H01M 4/04* (2006.01)
*B05D 3/12* (2006.01)
*B05D 3/02* (2006.01)
*B05D 3/10* (2006.01)
*B05D 7/00* (2006.01)
*H01M 4/30* (2006.01)
*H01M 4/88* (2006.01)
*H01M 4/52* (2010.01)
*B05D 5/12* (2006.01)

(52) U.S. Cl.
CPC .......... *G06F 3/0412* (2013.01); *G06F 3/0416* (2013.01); *H01B 13/0036* (2013.01); *B05D 3/0218* (2013.01); *B05D 3/10* (2013.01); *B05D 3/12* (2013.01); *B05D 5/12* (2013.01); *B05D 7/52* (2013.01); *B32B 2255/205* (2013.01); *G06F 2203/04105* (2013.01); *H01M 4/0402* (2013.01); *H01M 4/0409* (2013.01); *H01M 4/0435* (2013.01); *H01M 4/30* (2013.01); *H01M 4/52* (2013.01); *H01M 4/8896* (2013.01)

(58) Field of Classification Search
USPC .................................. 427/58, 428.01, 428.06
See application file for complete search history.

(56) References Cited

U.S. PATENT DOCUMENTS

| | | | |
|---|---|---|---|
| 8,748,749 B2* | 6/2014 | Srinivas | G06F 3/041 174/250 |
| 2011/0294036 A1* | 12/2011 | Sumioka | D04H 1/4242 429/482 |

* cited by examiner

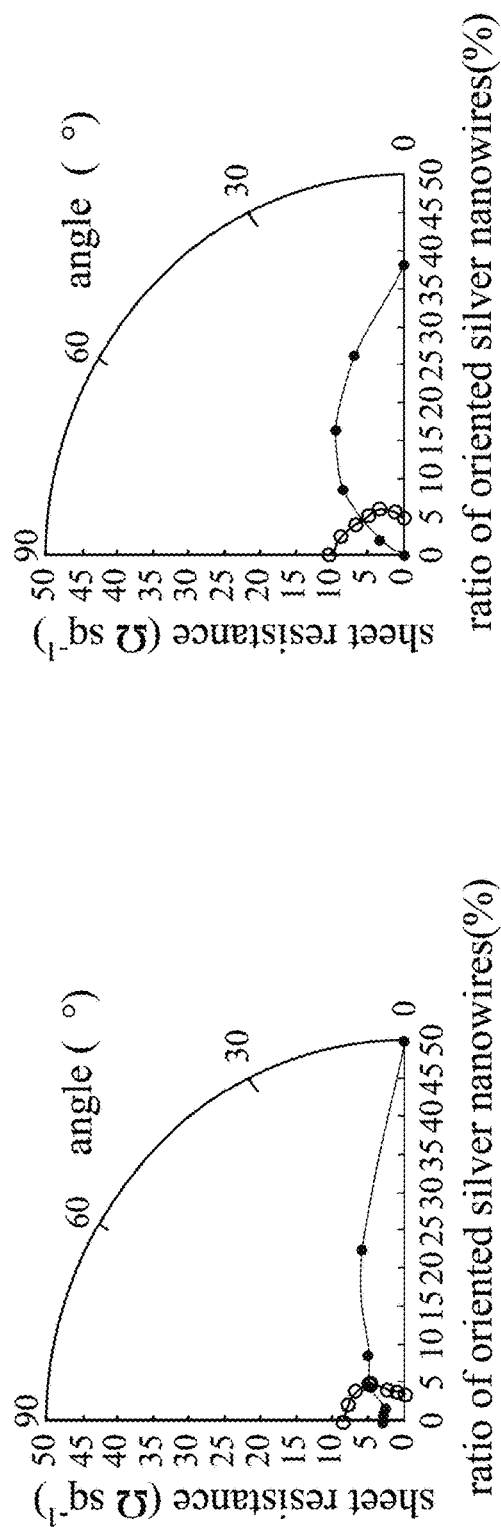
Fig. 5A
Fig. 5C
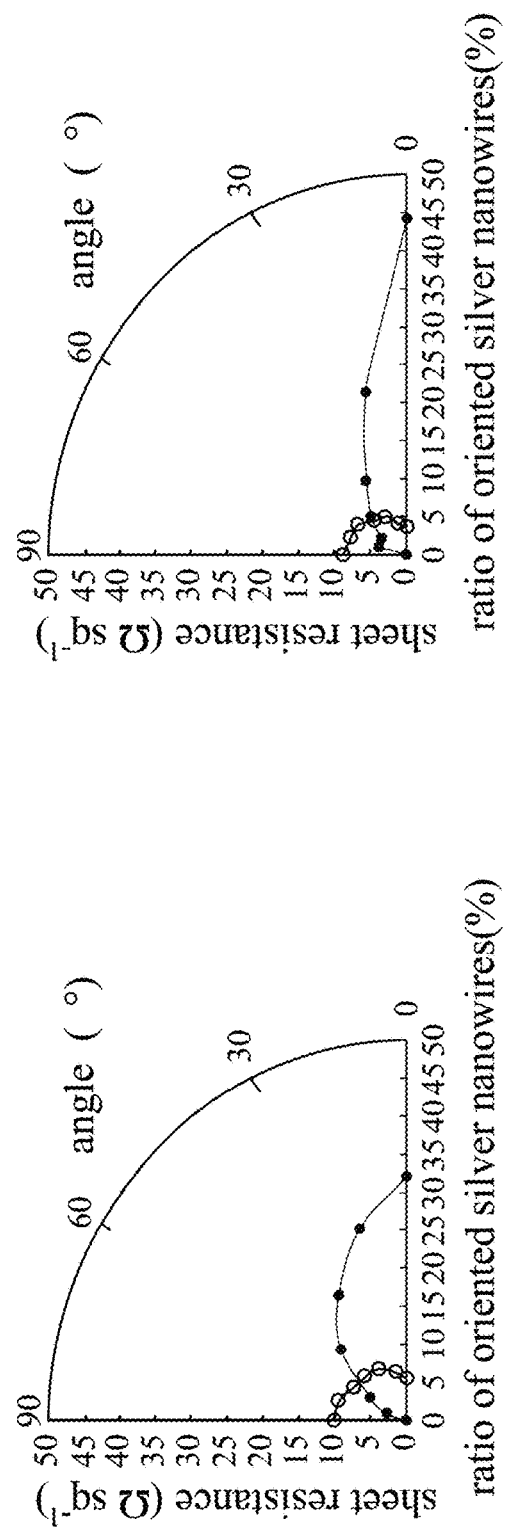
Fig. 5B
Fig. 5D

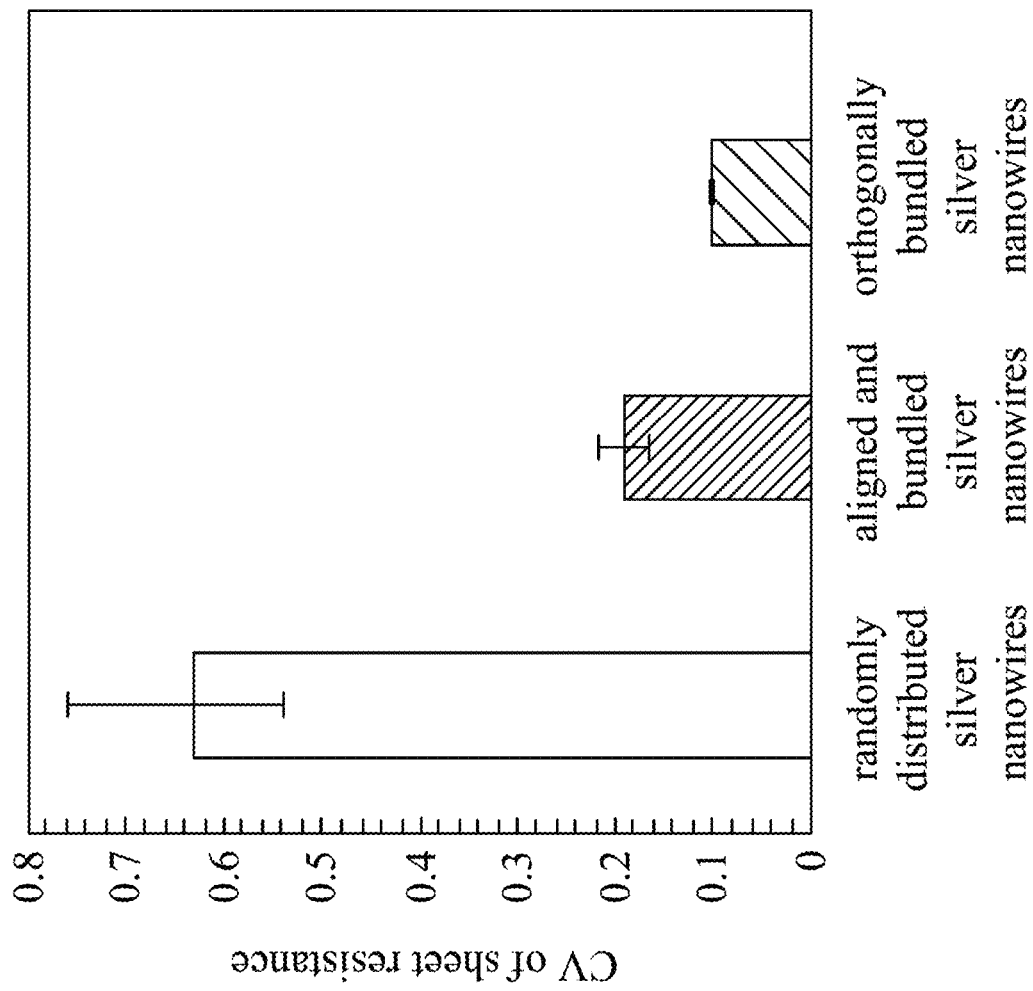

ELECTRODE THIN FILM AND METHOD FOR MANUFACTURING THE SAME

RELATED APPLICATIONS

This application claims priority to Taiwan Application Serial Number 106107394, filed Mar. 7, 2017, which is herein incorporated by reference.

BACKGROUND

Technical Field

The present disclosure relates to an electrode thin film and a method for manufacturing the same. More particularly, the present disclosure relates to an electrode thin film having a metal nanowires network with aligned and bundled metal nanowires and a method for manufacturing the same.

Description of Related Art

Along with the development of technology and the progress of time, various flexible electronic devices (e.g., flexible screen) have been available in the market. To meet the requirements of being capable to be bended, the transparent electrode thin films disposed on these electronic devices need to be flexible as well. In the flexible materials that can be used to manufacture the transparent electrode thin films, silver nanowire has been one of the most popular materials for having great conductivity and lower manufacturing cost. In addition, since the silver nanowire is adaptable to wet processes, it can be integrated with the roll-to-roll process to implement continuous production with large area.

However, in conventional ways of using the silver nanowires to make the electrode thin films, most of them need to perform surface treatment to the substrate in advance or use molds with special structures to align and bundle the silver nanowires. Therefore, the conventional ways are difficult to be integrated with the roll-to-roll process to implement continuous production with large area.

Hence, to people having ordinary skills in the art, it is crucial to design a silver nanowire manufacturing process that can be integrated with the roll-to-roll process.

SUMMARY

The present disclosure provides a method for manufacturing an electrode thin film, including: determining a height between a first roller and a substrate and a coating speed for the first roller coating a first metal nanowire suspension liquid onto the substrate based on a suspension property of the first metal nanowire suspension liquid; coating, by using the first roller, the first metal nanowire suspension liquid onto the substrate with the coating speed to form a wetting film on the substrate; and controlling a first temperature of the substrate heating the wetting film based on the suspension property of the first metal nanowire suspension liquid to dry the wetting film as the electrode thin film, wherein the first temperature makes a dewetting speed of the wetting film higher than a drying speed of the wetting film. The height ranges between 0.2 mm and 0.8 mm, the first temperature ranges between 100° C. and 140° C., and the coating speed ranges between 2 cm/s and 10 cm/s.

The present disclosure provides an electrode thin film manufactured by using the aforementioned method, wherein the electrode thin film includes a metal nanowire network with a plurality of metal nanowires which are aligned and bundled, and an average aspect ratio of the metal nanowires in the metal nanowire network ranges between 100 and 1856.

BRIEF DESCRIPTION OF THE DRAWINGS

The present disclosure can be more fully understood by reading the following detailed description of the embodiment, with reference made to the accompanying drawings as follows:

FIG. 5A to FIG. 5D show polar graphs of angles versus the sheet resistances and ratios of oriented silver nanowires according to four embodiments of the present disclosure;

FIG. 7A shows a comparison of the uniformities of silver nanowires according to an exemplary embodiment of the present disclosure;

DETAILED DESCRIPTION

Figure 1:
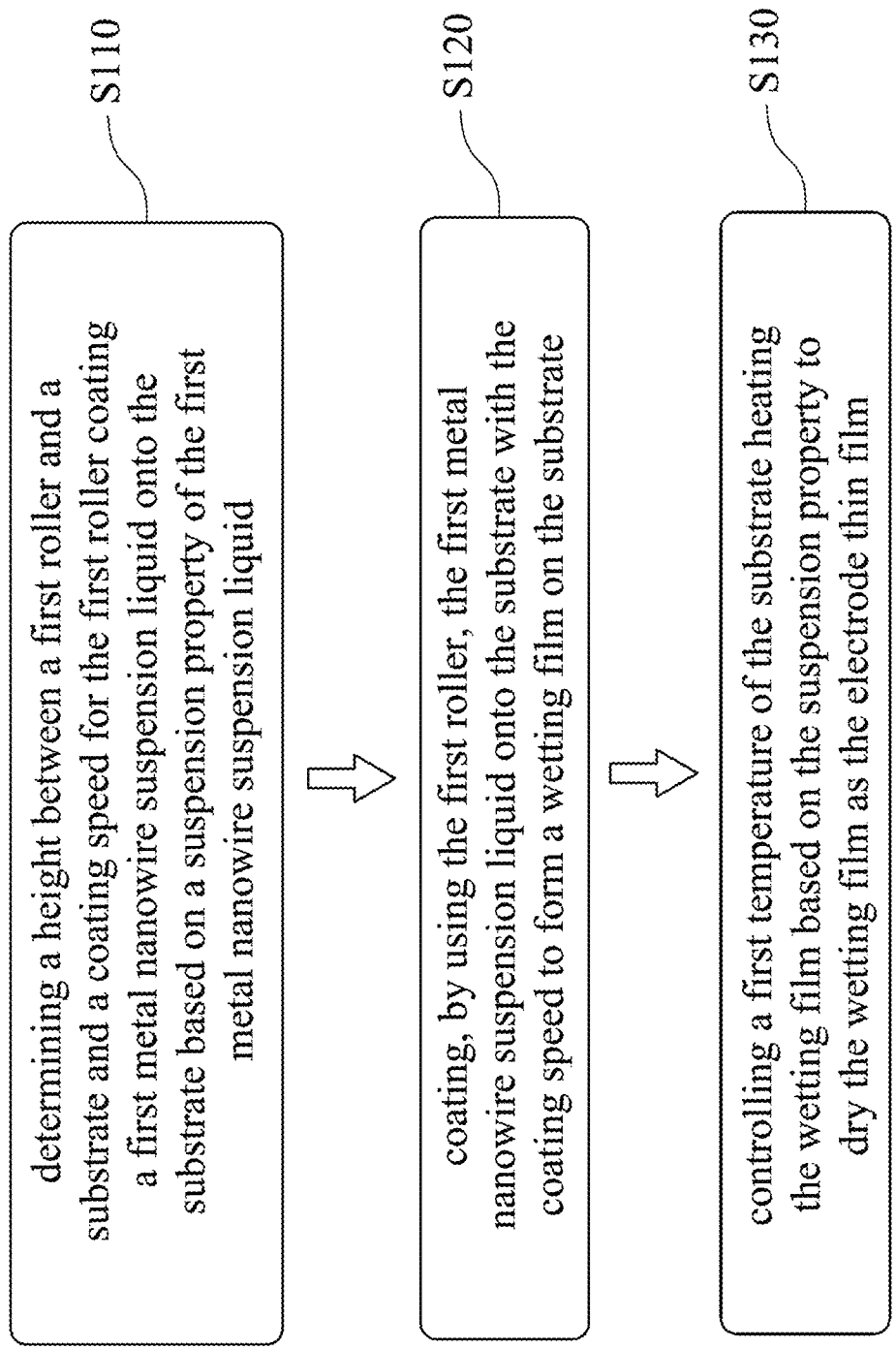
FIG. 1 is a flow chart illustrating a method for manufacturing an electrode thin film according to an exemplary embodiment of the present disclosure.
Figure 2:
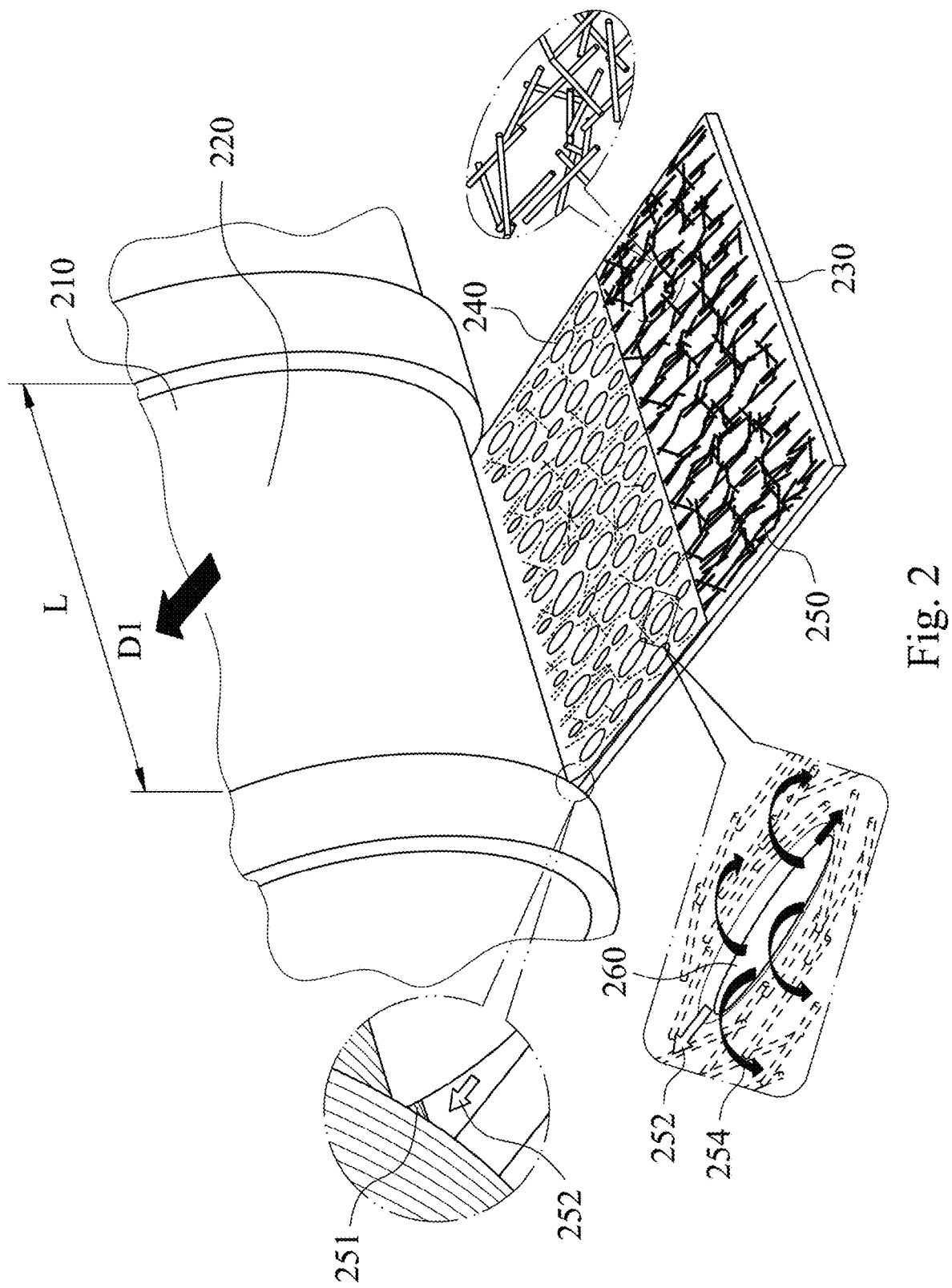
FIG. 2 is a schematic diagram of manufacturing the electrode thin film according to FIG. 1.

FIG. 1 is a flow chart illustrating a method for manufacturing an electrode thin film according to an exemplary embodiment of the present disclosure. FIG. 2 is a schematic diagram of manufacturing the electrode thin film according to FIG. 1. See FIG. 1 and FIG. 2. In step S110, a height between a first roller 210 and a substrate 230 and a coating speed for the first roller 210 coating a first metal nanowire suspension liquid 220 onto the substrate 230 can be determined based on a suspension property of the first metal nanowire suspension liquid 220. Next, in step S120, the first metal nanowire suspension liquid 220 may be coated, by using the first roller 210, onto the substrate 230 with the coating speed to form a wetting film 240 on the substrate 230. In one embodiment, the first roller 210 may be distant from the substrate 230 by the aforementioned height when coating. Afterwards, in step S130, a first temperature of the substrate 230 heating the wetting film 240 may be controlled based on the suspension property to dry the wetting film 240 as the electrode thin film 250. The first temperature may make a dewetting speed of the wetting film 240 higher than a drying speed of the wetting film 240.

In one embodiment, the suspension property may be determined based on a surface tension (represented by $\gamma$), a viscosity (represented by $\mu$), and a contact angle (represented by $\theta$). For example, the suspension property may be calculated by $(\gamma/\mu)\theta^3$. The suspension property may be 3511 under the assumption that $\gamma$ is 21.4 mN/m, $\mu$ is 21.4 mPa, and $\theta$ is 15.2. Next, the aforementioned height, coating speed and the first temperature may be determined according to the calculated suspension property. Detailed descriptions will be discussed in the following paragraphs.

In one embodiment, the first temperature may be lower than a boiling point of the first metal nanowire suspension liquid 220. For example, if the boiling point of the first metal nanowire suspension liquid 220 is 82.5° C., the first temperature may be set as 80° C., but the present disclosure is not limited thereto. Additionally, the first roller 210 may be a first rolling rod whose surface may be disposed with a plurality of bump structures. In one embodiment, the bump structure may be a spiral structure, and the distance L therebetween may be determined based on the selected first rolling rod. In other embodiments, the first rolling rod may be a Meyer rod. The Meyer rod may be, for example, Meyer rod #14 having spiral structures disposed on the surface thereof. Under this situation, the distance L between the spiral structures may be 0.36 mm.

Specifically, when the first roller 210 moistened by the first metal nanowire suspension liquid 220 rolls on the substrate 230 toward a first direction D1, there will be a meniscus fluid 251 at the back side of the first roller 210. Meanwhile, the meniscus fluid 251 will generate a pulling force 252 having a direction identical to the first direction D1 and pulling the wetting film 240 toward the first direction D1. At this moment, there will exist two phenomena on the wetting film 240: (1) the wetting film 240 heated by the substrate 230 gradually dries out; and (2) the wetting film 240 pulled by a surface tension 254 gradually dewets. For ease of the following descriptions, the first metal nanowire suspension liquid 220 will be assumed to be a suspension liquid including silver nanowires, but the present disclosure is not limited thereto.

In general, a drying speed of a wetting film in conventional rolling manufacturing process is controlled to be much higher than a dewetting speed of the wetting film, such that the wetting film may be dried as an electrode thin film before the wetting film dewets for being pulled by the surface tension. In this way, the silver nanowires in the electrode thin film will be randomly distributed in the electrode thin film rather than gathering as a cluster.

However, the method proposed in the present disclosure controls the first temperature of the substrate 230 to be a temperature (e.g., 80° C.) making the dewetting speed of the wetting film 240 slightly higher than the drying speed of the wetting film 240, which is contrary to the conventional way. Under this condition, the surface tension 254 that dewets the wetting film 240 will squeeze the silver nanowires to make them bundled. Meanwhile, the pulling force 252 will pull a hole 260 of the wetting film 240 to be elliptical, such that the silver nanowires can be aligned. Hence, an electrode thin film 250 having a silver nanowire network with aligned and bundled silver nanowires can be obtained.

Noted that since the silver nanowires are squeezed by the hole 260 to be aligned and bundled in the present disclosure, the performance of squeezing the silver nanowires will be worse if the hole 260 is too small. Experiments show that the size of the hole 260 is related to the aforementioned height, the coating speed, and the first temperature, and hence the size of the hole 260 can be adjusted by manipulating the three parameters to guarantee that the silver nanowires can be aligned and bundled.

For example, when the suspension property of the first metal nanowire suspension liquid 220 is 3511 as mentioned in the above, experiments show that the size of the hole 260 will be large enough to squeeze the silver nanowires to make them aligned and bundled if the height ranges between 0.2 mm and 0.8 mm, the first temperature ranges between 100° C. and 140° C., and the coating speed ranges between 2 cm/s and 10 cm/s. That is, the height, the coating speed, and the first temperature can be set based on the aforesaid numerical ranges to ensure that the silver nanowires in the electrode thin film 250 can be aligned and bundled.

As can be understood from the above discussions, the method for manufacturing the electrode thin film proposed in the present disclosure may align and bundle the silver nanowires via a single-step rolling and temperature control of the substrate. Therefore, the method of the present disclosure is applicable to implement continuous production with large area. Besides, under the situation that the silver nanowires are well aligned and bundled, the electrode thin film 250 of the present disclosure may further have advantages such as great light transmission rate, low sheet resistance, high adhesion to substrate, high flexibility, high stability, and high durability over heat fatigue. The advantages will be discussed with reference to experimental data in the following descriptions.

In one embodiment, the method of the present disclosure may further implement a water bath method to the electrode thin film 250 to remove a dispersing agent (e.g., polyvinylpyrrolidone (PVP)) on the electrode thin film. In a further embodiment, a duration of implementing the water bath method may be longer than 30 seconds, but the present disclosure is not limited thereto. Experiments show that the sheet resistance of the electrode thin film 250 which has experienced the water bath method becomes 20 times lower.

Furthermore, in another embodiment, the method of the present disclosure may further implement a hot pressing treatment to the electrode thin film 250 which has experienced the water bath method to reduce a surface roughness of the electrode thin film 250. In the present embodiment, a second temperature of implementing the hot pressing treatment may be lower than 120° C., and a pressure of implementing the hot pressing treatment may range between 100 and 1750 kPa, but the present disclosure is not limited thereto. Experiments show that when the coating speed of the first roller 210 is 10 cm/s, the surface roughness of the electrode thin film 250 which has experienced the hot pressing treatment may be smoothed from 117 nm to 77 nm.

Noted that there exists a conventional way that presses the silver nanowires under environments with high temperature (e.g., 160° C.) and high pressure (25 MPa) to lower the contact resistance between the silver nanowires, and hence it is difficult to integrate this kind of environments with the roll-to-roll process. However, with the electrode thin film 250 manufactured by the method of the present disclosure, the silver nanowires can be pressed and smoothed in an environment with a temperature of 120° C. and a pressure of 1750 kPa after the electrode thin film 250 has experienced the water bath method, such that the difficulty of integrating with the roll-to-roll process can be reduced.

Figure 3:
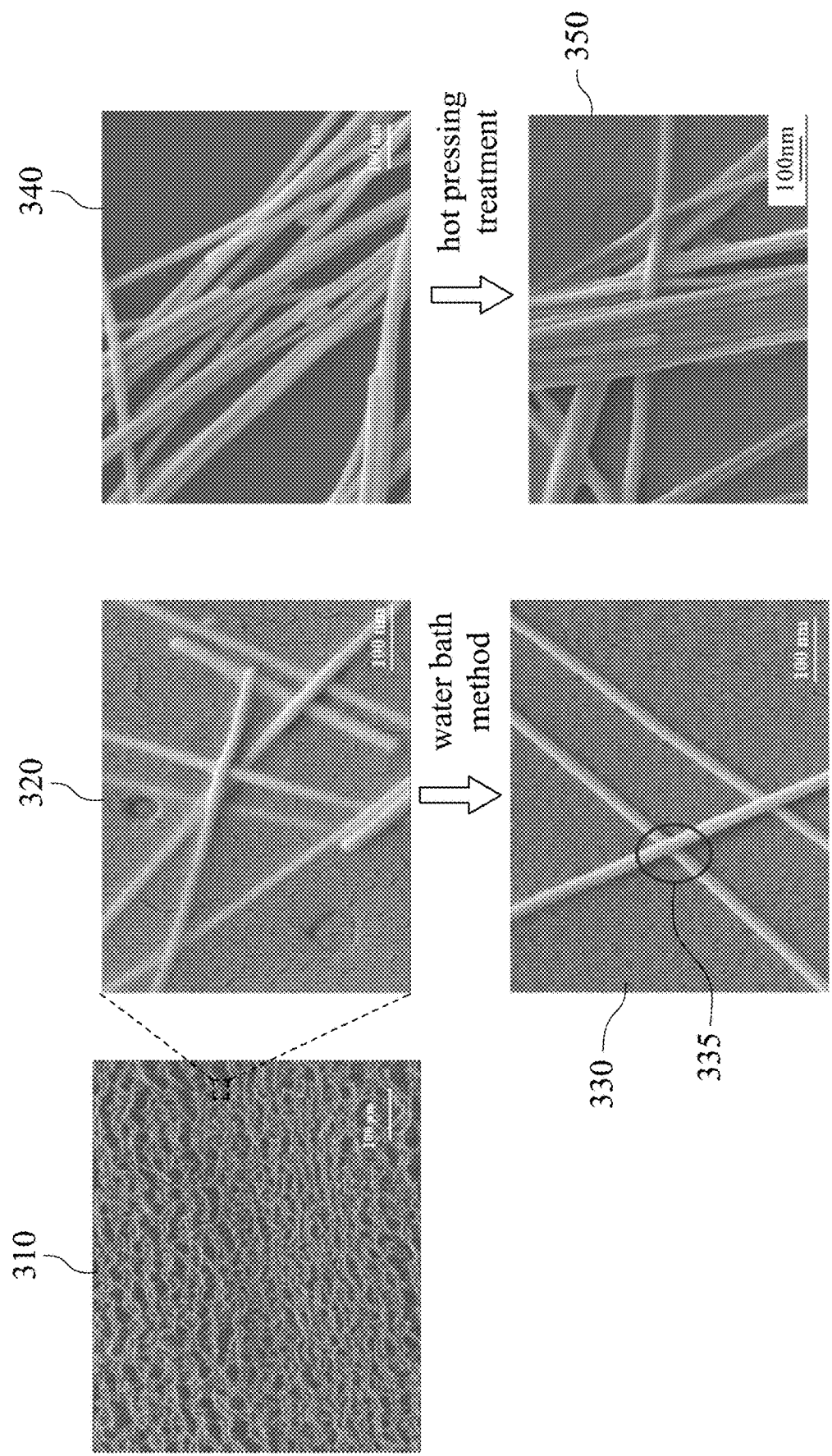
FIG. 3 is a schematic diagram of manufacturing the electrode thin film according to FIG. 1 and FIG. 2.

See FIG. 3, which is a schematic diagram of manufacturing the electrode thin film according to FIG. 1 and FIG. 2. In the present embodiment, an image 310 is, for example, an electrode thin film 305 manufactured in step S120, wherein the electrode thin film 305 includes a silver nanowire network with aligned and bundled silver nanowires. As can be observed from an enlarged image 320 of the image 310, there are some residual PVP on the silver nanowires. An image 330 shows a schematic view of the silver nanowires after implementing the water bath method to the electrode thin film 305 to wash away PVP for reducing the sheet resistance (by about 2000%). Comparing with the image 320, PVP at an intersection 335 of the silver nanowires in the image 330 is less, and hence the sheet resistance can be reduced. An image 340 shows a schematic view of the silver nanowires before experiencing the hot pressing treatment, and an image 350 shows a schematic view of the silver nanowires after experiencing the hot pressing treatment. As can be observed from the image 350, the silver nanowires have been pressed to have more contact areas, such that both of the surface roughness and the sheet resistance of the electrode thin film can be reduced (by about 35% and 10%, respectively). Measurements show that an average aspect ratio of the silver nanowires in the silver nanowire network manufactured via the method of the present disclosure ranges between 100 and 1856.

Figure 4:
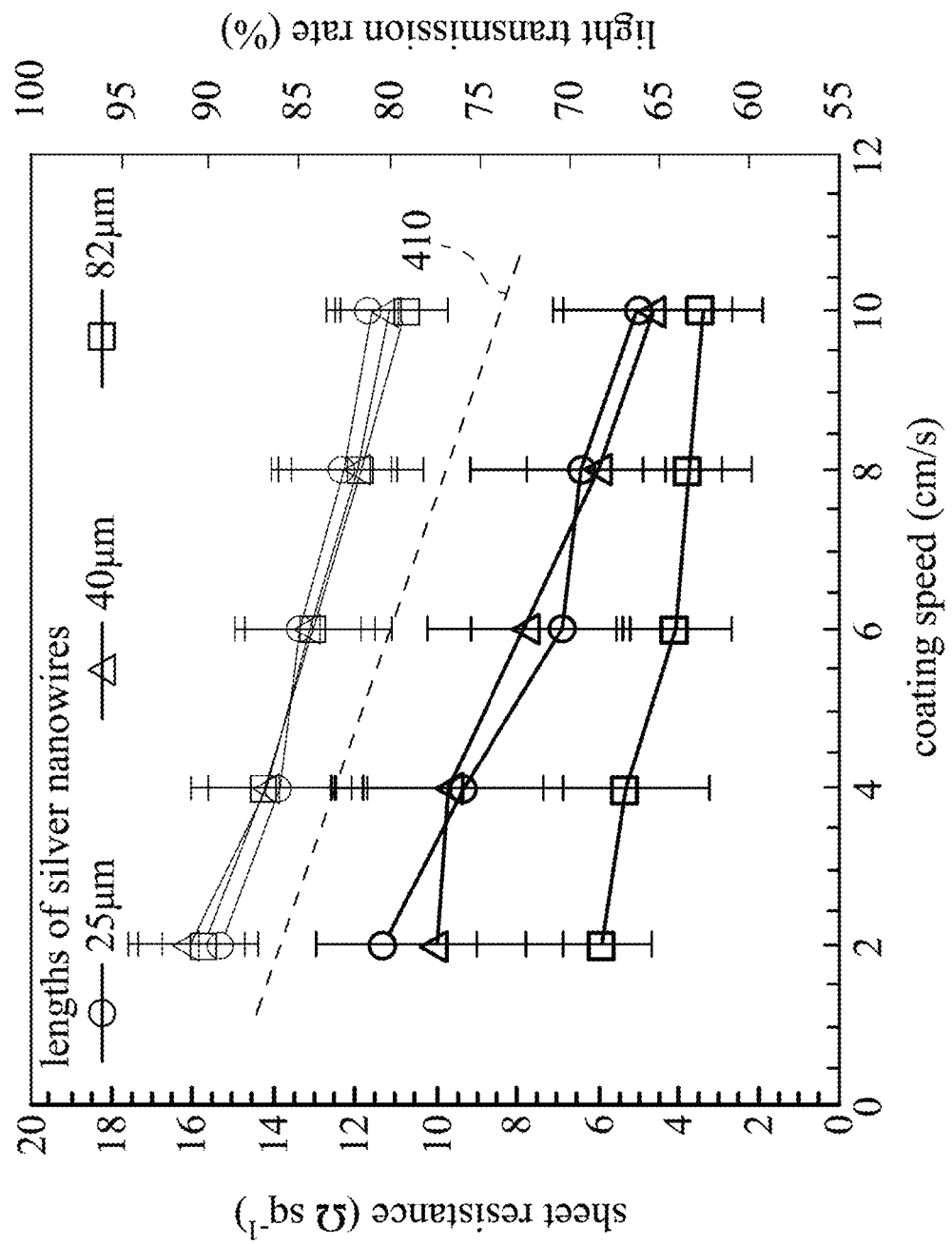
FIG. 4 is a schematic diagram of the sheet resistance and light transmission rate of the electrode thin film manufactured under various coating speeds according to an exemplary embodiment of the present disclosure.

See FIG. 4, which is a schematic diagram of the sheet resistance and light transmission rate of the electrode thin film manufactured under various coating speeds according to an exemplary embodiment of the present disclosure. In the present embodiment, the considered lengths of the silver nanowires are 25, 40, and 82 μm, respectively. In addition, the region over a reference line 410 corresponds to the light transmission rate, and the region below the reference line 410 corresponds to the sheet resistance. As can be observed from FIG. 4, to the silver nanowires with the three considered lengths, the sheet resistance and the light transmission rate will decrease as the coating speed increases.

See FIG. 5A to FIG. 5D, which show polar graphs of angles versus the sheet resistances and ratios of oriented silver nanowires according to four embodiments of the present disclosure. The coating speeds corresponded to FIG. 5A to FIG. 5D are 10, 4, 6, and 8 cm/s, and the hollowed point and solid point correspond to the sheet resistance and the ratio of oriented silver nanowires, respectively. As can be observed from FIG. 5A to FIG. 5D, the sheet resistances measured from different angles differ from each other, and more than 85% of the silver nanowires are oriented within ±30 degrees. That is, the silver nanowires on the electrode thin film of the present disclosure are well-aligned.

Figure 6A:
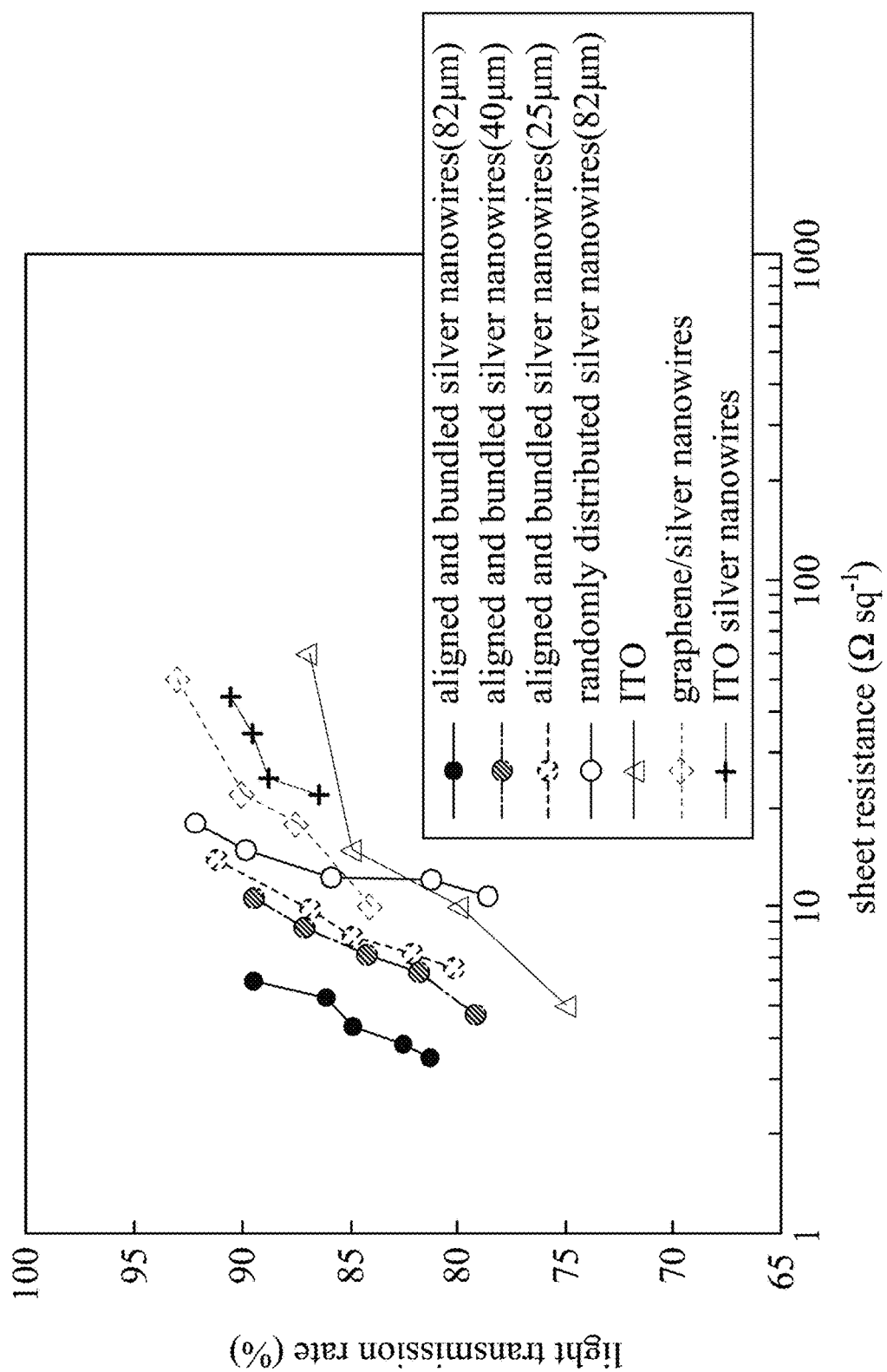
FIG. 6A is a schematic diagram of the sheet resistance versus the light transmission rate of the electrode thin film according to an exemplary embodiment of the present disclosure.
Figure 6B:
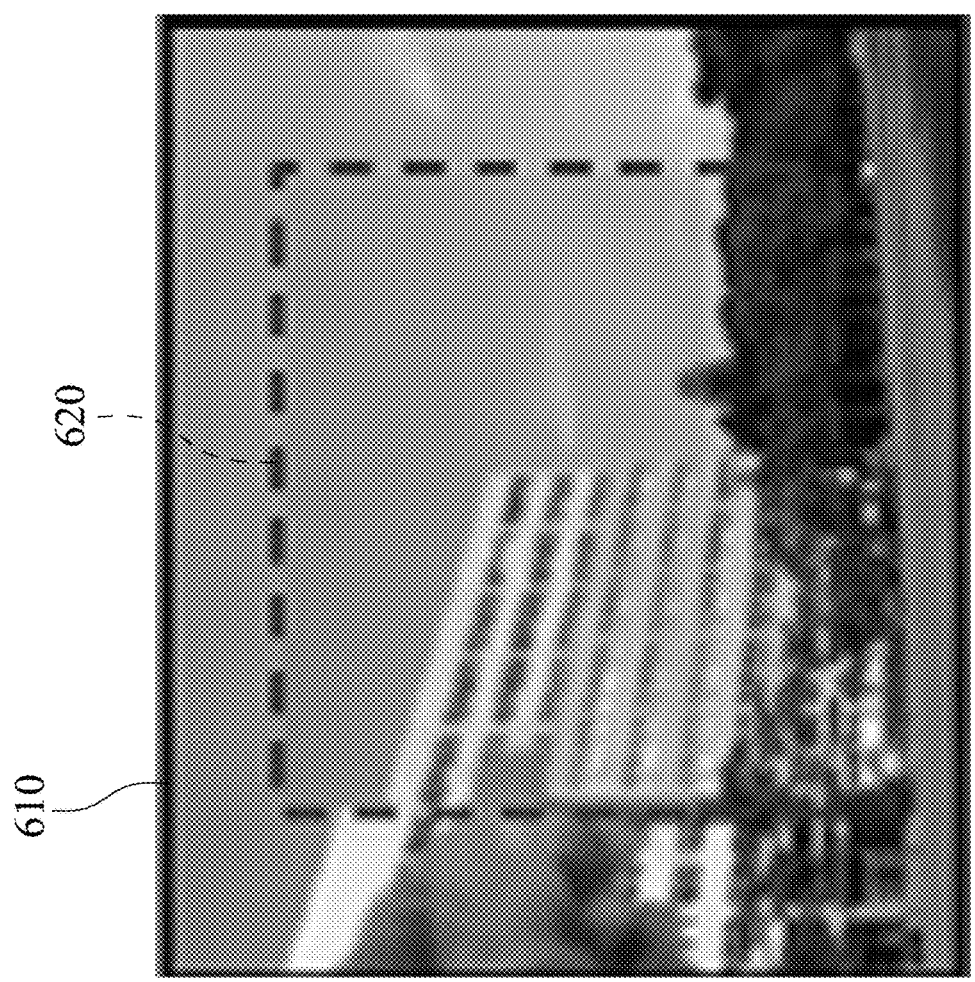
FIG. 6B is a schematic of covering an image with an electrode thin film according to FIG. 6A.

See FIG. 6A, which is a schematic diagram of the sheet resistance versus the light transmission rate of the electrode thin film according to an exemplary embodiment of the present disclosure. As can be observed from FIG. 6A, the light transmission rate and the sheet resistance of the aligned and bundled silver nanowires with lengths of 25, 40, and 82 μm of the present disclosure are generally better than conventional ways (e.g., the randomly distributed silver nanowires, indium tin oxide (ITO), graphene/silver nanowire, and ITO/silver nanowire, etc.) Next, see FIG. 6B, which is a schematic of covering an image 610 with an electrode thin film 620 according to FIG. 6A. As can be observed from the image 610, the visibility of the image 610 will not be affected even the image 610 is covered with the electrode thin film 620 of the present disclosure. That is, the electrode thin film 620 has great light transmission rate.

In other embodiments, a second roller can be further used to coat a second metal nanowire suspension liquid onto the electrode thin film of the present disclosure. A first direction of the first roller coating the first metal nanowire suspension liquid may be different from a second direction of the second roller coating the second metal nanowire suspension liquid. Both of the first metal nanowire suspension liquid and the second metal nanowire suspension liquid may include silver. In one embodiment, the second direction may be orthogonal to the first direction, and the silver nanowire network on the electrode thin film made in this way ("orthogonally bundled silver nanowires" hereinafter) will have a better uniformity.

Figure 7B:
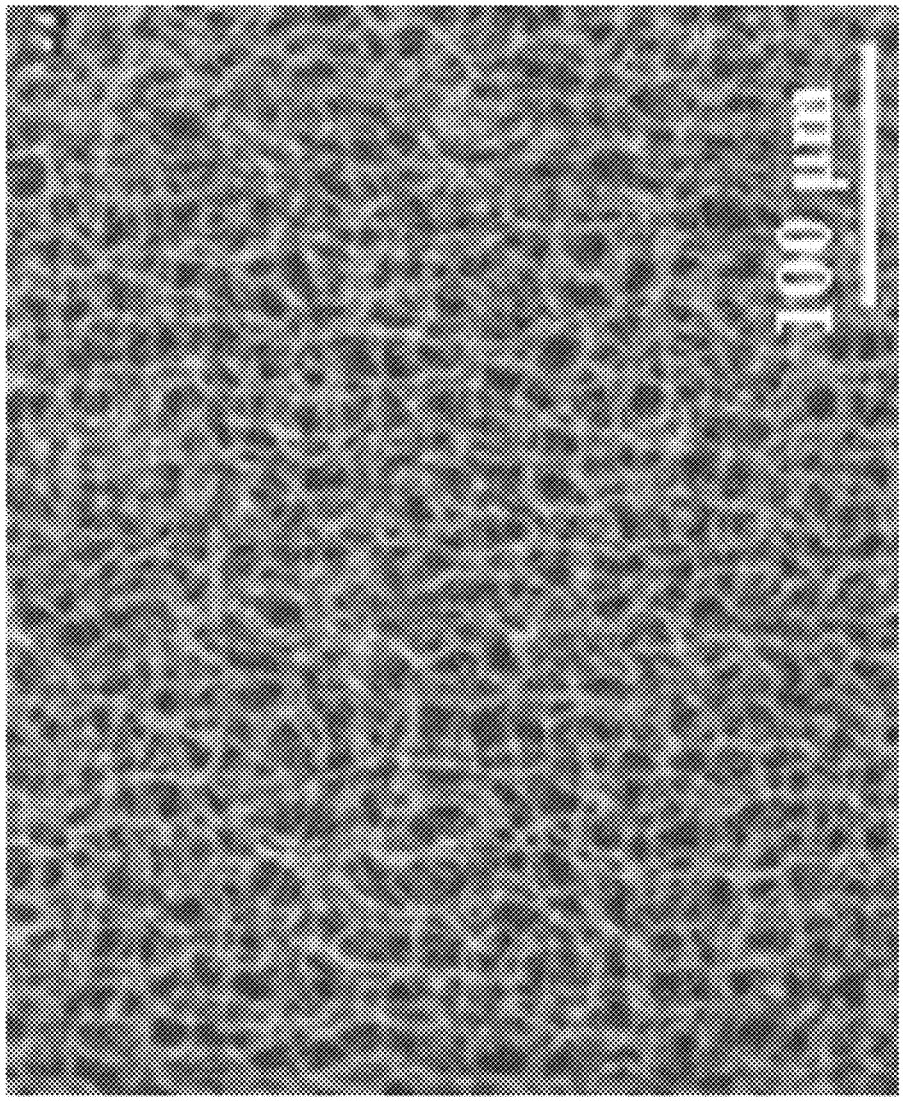
FIG. 7B shows a schematic diagram of the uniformity of the orthogonally bundled silver nanowires according to FIG. 7A.

See FIG. 7A, which shows a comparison of the uniformities of silver nanowires according to an exemplary embodiment of the present disclosure. As can be observed from FIG. 7A, compared with the randomly distributed silver nanowires and the aligned and bundled silver nanowires, the covariance (CV) of the orthogonally bundled silver nanowires is lower, i.e., a better uniformity. Next, see FIG. 7B, which shows a schematic diagram of the uniformity of the orthogonally bundled silver nanowires according to FIG. 7A. As can be observed from FIG. 7B, the silver nanowire network formed by the orthogonally bundled silver nanowires has a better uniformity than the electrode thin film of the image 310 shown in FIG. 3.

Figure 8:
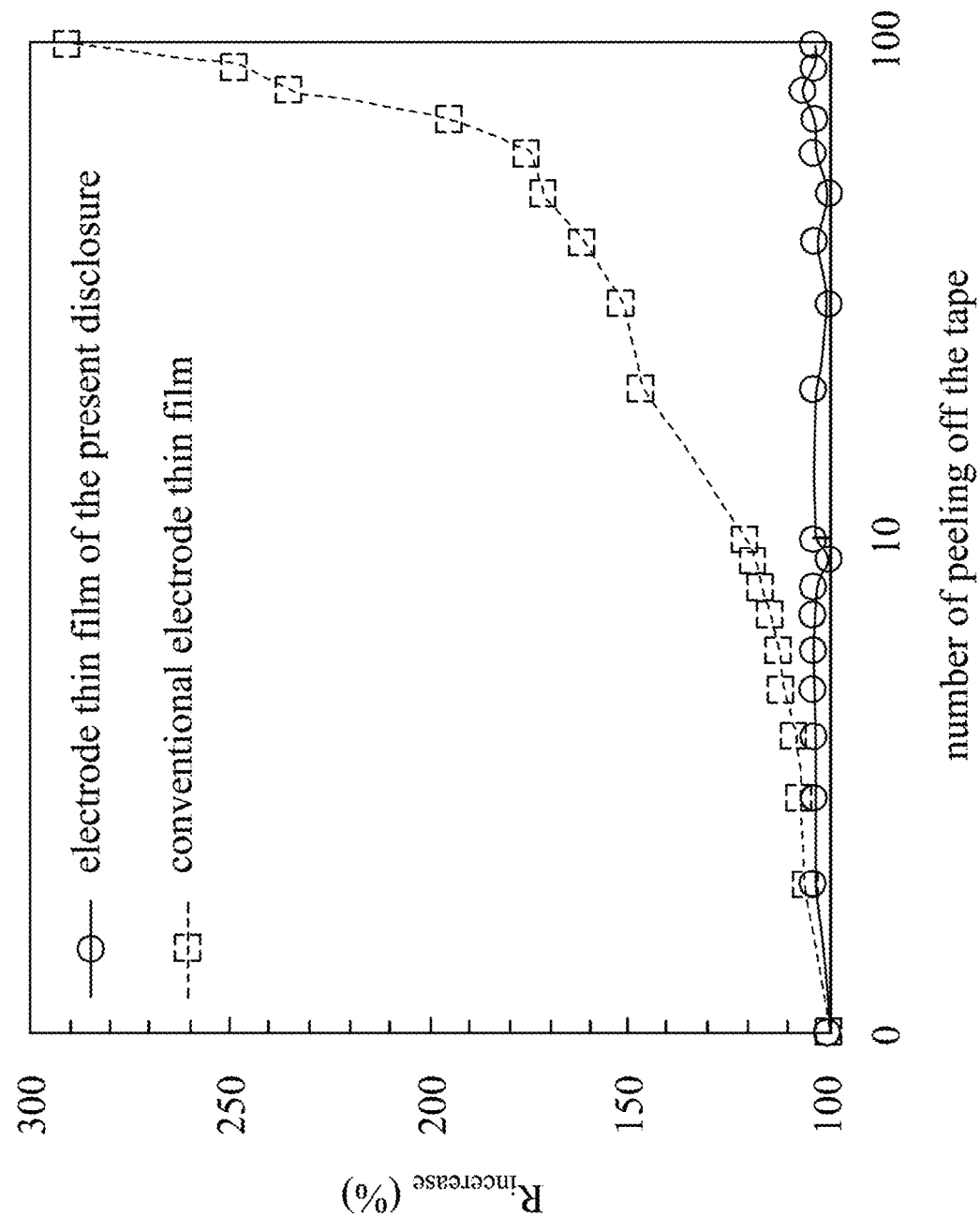
FIG. 8 shows a schematic diagram of the adhesion of the electrode thin film to the substrate according to an exemplary embodiment of the present disclosure.

See FIG. 8, which shows a schematic diagram of the adhesion of the electrode thin film to the substrate according to an exemplary embodiment of the present disclosure. In the present embodiment, the horizontal axis represents the number of peeling off a tape from the electrode thin film, and the vertical axis represents the percentage the sheet resistance increases. As can be observed from FIG. 8, after peeling off the tape for a hundred times, the sheet resistance of the conventional electrode thin film including randomly distributed silver nanowires increases to be about 300% because the silver nanowires are repeatedly peeled off. However, the electrode thin film of the present disclosure merely increases to be 103%. That is, the silver nanowires on the electrode thin film of the present disclosure is difficult to be peeled off for having a better adhesion to the substrate. In other words, before performing further processes (e.g., washing with solvents or spin coating with solvents having high adhesion) to the electrode thin film of the present disclosure, there is no need to coat other adhesion layers or covering layers onto the electrode thin film of the present disclosure because the electrode thin film of the present disclosure is hard to be damaged for having a great adhesion to the substrate.

Further, in conventional ways, the manufactured electrode thin film will be applied with currents to sinter the silver nanowires in the electrode thin film for reducing the contact resistance. However, if the electrode thin film is still applied with unbearable currents after sintering, the sheet resistance of the electrode thin film will increase since the silver nanowires are burnt down.

Figure 9:
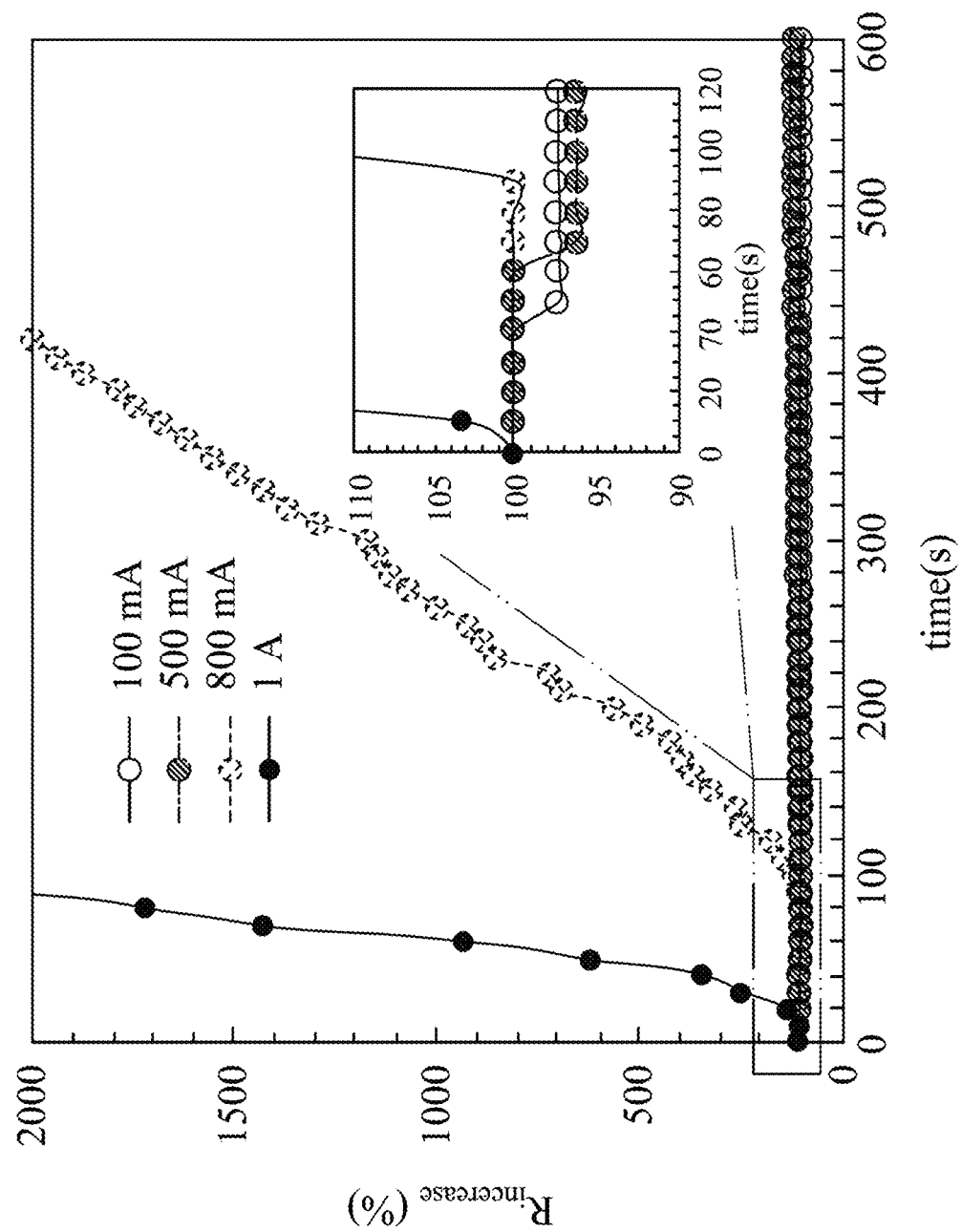
FIG. 9 shows a schematic of a joule pressure test of the electrode thin film according to an exemplary embodiment of the present disclosure.

See FIG. 9, which shows a schematic of a joule pressure test of the electrode thin film according to an exemplary embodiment of the present disclosure. In the present embodiment, the horizontal axis represents a duration of applying currents (e.g., 0.1, 0.5, 0.8, and 1 ampere) to the electrode thin film, and the vertical axis represents the percentage the sheet resistance increases.

Since most of the silver nanowires in the electrode thin film of the present disclosure are closely attached to each other, the main cause of the contact resistance is the insulated polymer PVP covering on the surface of the silver nanowires. However, in conventional electrode thin film with randomly distributed silver nanowires, the contact resistance not only comes from the covering PVP, but also comes from the insecure connections between the silver nanowires. Therefore, the conventional electrode thin film needs to be additionally sintered.

However, as can be observed from FIG. 9, the sheet resistance of the electrode thin film of the present disclosure merely reduces by 3% at the beginning of applying the currents since the silver nanowires are bundled. Afterwards, under the situation of continuous bearing overloading currents, the electrode thin film is broken for overly heated, and hence the sheet resistance increases. Accordingly, the silver nanowires in the electrode thin film of the present disclosure have been well-sintered after the aforementioned steps (e.g., the step S110, the step S120, the water bath method, and the hot pressing method, etc.). In other words, the electrode thin film of the present disclosure does not need to be additionally sintered, and hence the efficiency of manufacturing can be higher than conventional electrode thin films.

Figure 10A:
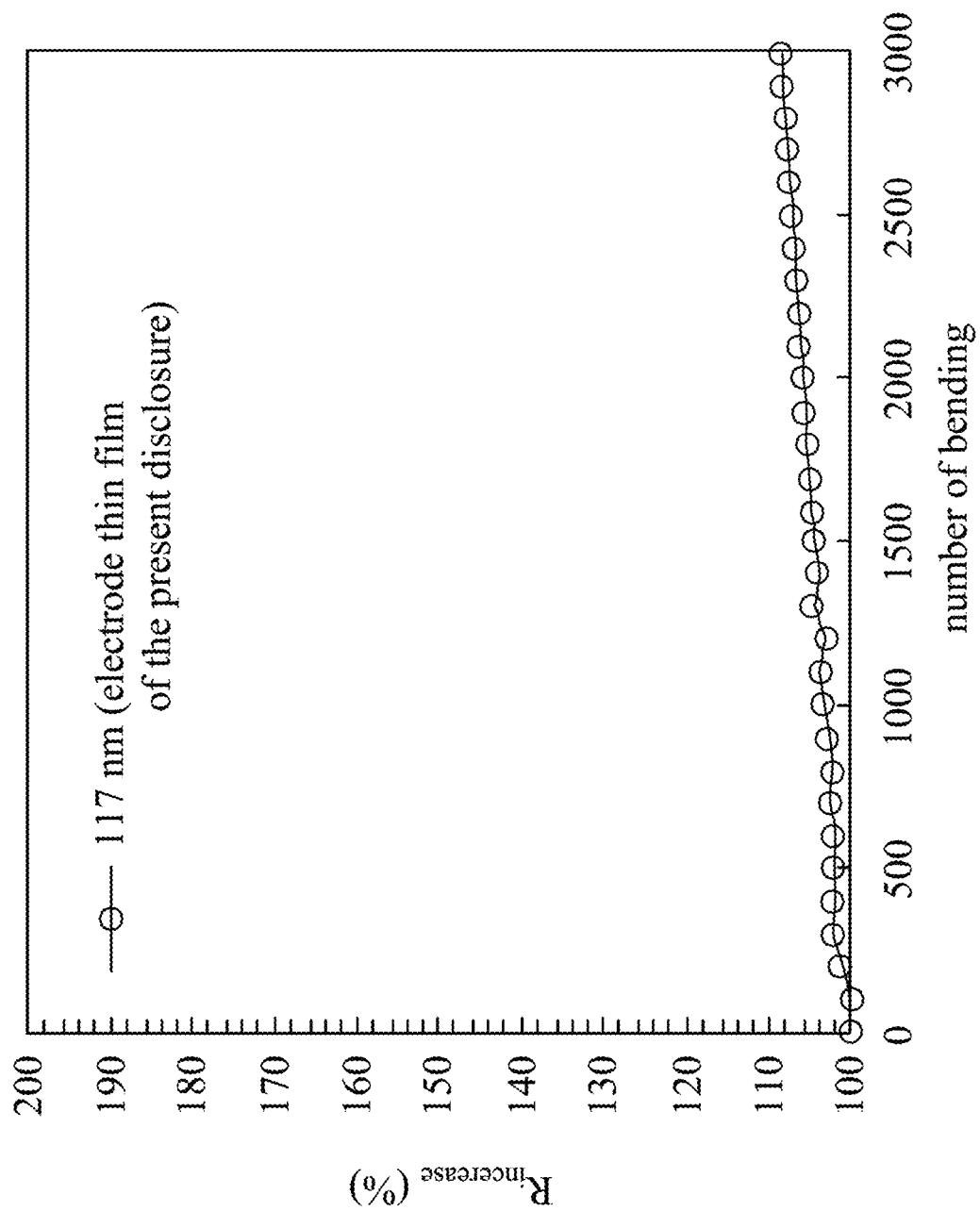
FIG. 10A is a schematic diagram illustrating the flexibility of the proposed electrode thin film according to an exemplary embodiment of the present disclosure.
Figure 10B:
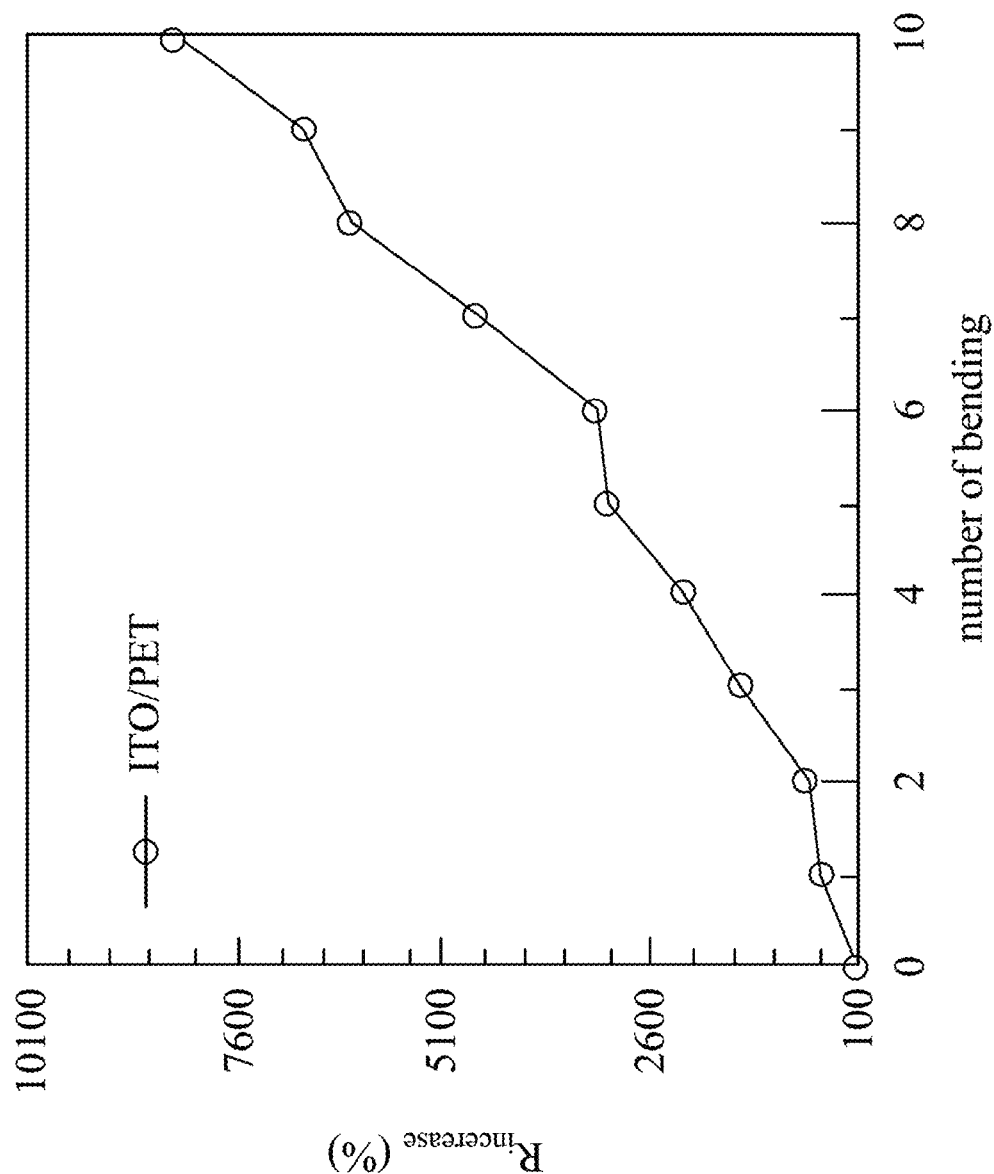
FIG. 10B is a schematic diagram illustrating the flexibility of the electrode thin film of ITO/PET according to an exemplary embodiment of the present disclosure.

FIG. 10A is a schematic diagram illustrating the flexibility of the proposed electrode thin film according to an exemplary embodiment of the present disclosure, and FIG. 10B is a schematic diagram illustrating the flexibility of the electrode thin film of ITO/PET according to an exemplary embodiment of the present disclosure. In FIG. 10A and FIG. 10B, the horizontal axis represents the number of bending the electrode thin film, and the vertical axis represents the percentage the sheet resistance increases. As can be observed from FIG. 10B, the sheet resistance of the electrode thin film made of ITO/PET increases to be over 7600% after ten times of bending (whose bending radius is 1 mm). In FIG. 10A, however, the sheet resistance of the electrode thin film (whose thickness is 117 nm) of the present disclosure merely increases to be 108% after 3000 times of bending (whose bending radius is 1 mm). Accordingly, the electrode thin film of the present disclosure is suitable to be disposed on flexible electronic devices for having great flexibility.

Figure 11A:
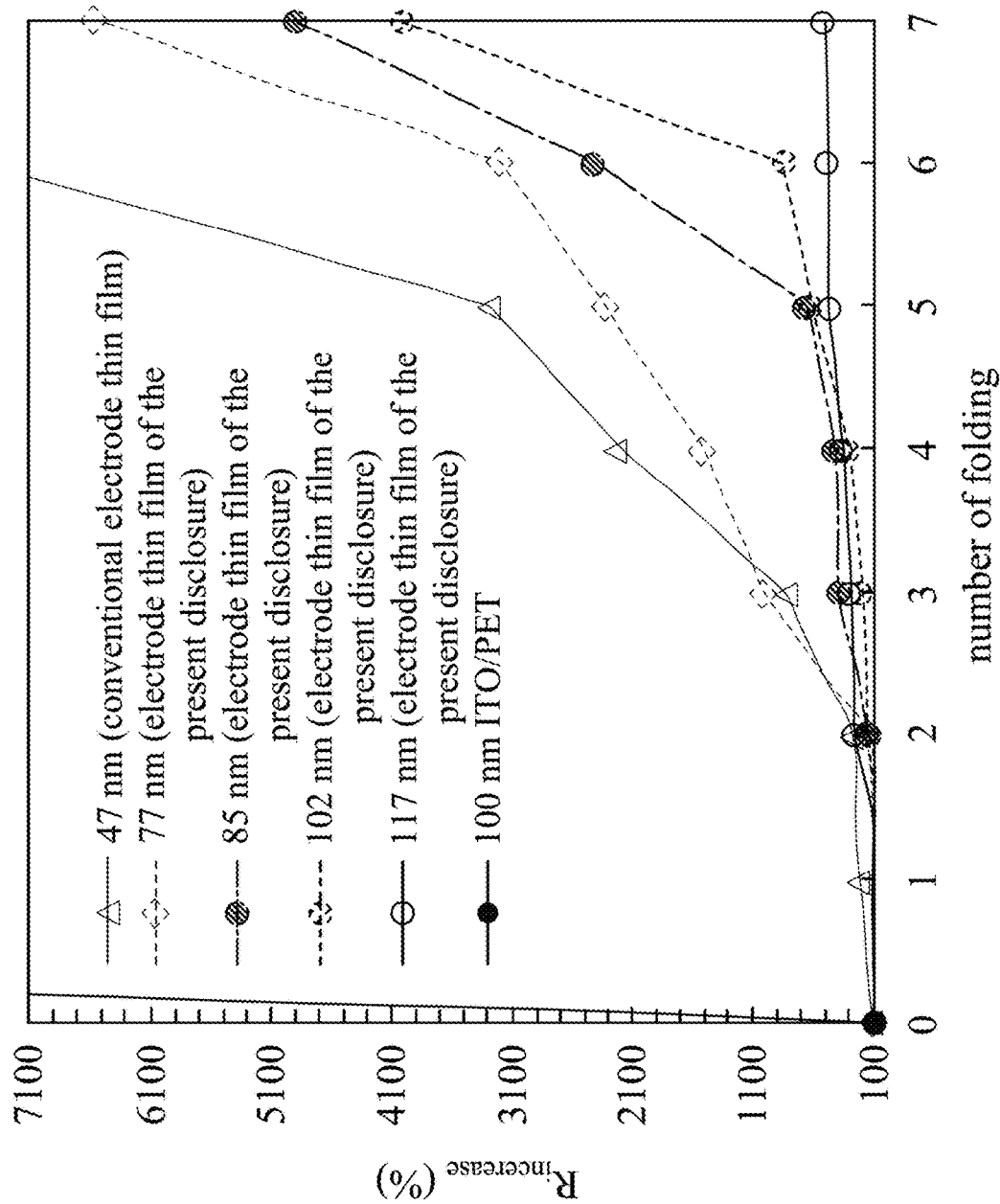
FIG. 11A is a schematic diagram of the flexibility of the electrode thin film according to another embodiment of the present disclosure.
Figure 11B:
FIG. 11B is a schematic diagram of folding the electrode thin film according to an exemplary embodiment of the present disclosure.

FIG. 11A is a schematic diagram of the flexibility of the electrode thin film according to another embodiment of the present disclosure, and FIG. 11B is a schematic diagram of folding the electrode thin film according to an exemplary embodiment of the present disclosure. In FIG. 11A, the horizontal axis represents the number of folding the electrode thin film in the way shown in FIG. 11B, and the vertical axis represents the percentage the sheet resistance increases. As can be observed from FIG. 11A, the ITO/PET electrode thin film whose thickness is 100 nm is broken after experiencing one folding. Comparing with the conventional electrode thin film with randomly distributed silver nanowires, the performance of the electrode thin film of the present disclosure is better. Specifically, the sheet resistance of the electrode thin film whose thickness is 117 nm of the present disclosure merely increases to be 507% after 7 times of folding. As can be understood from FIG. 10A and FIG. 11A, the electrode thin film of the present disclosure is suitable to be disposed on flexible electronic devices for having great flexibility.

Figure 12:
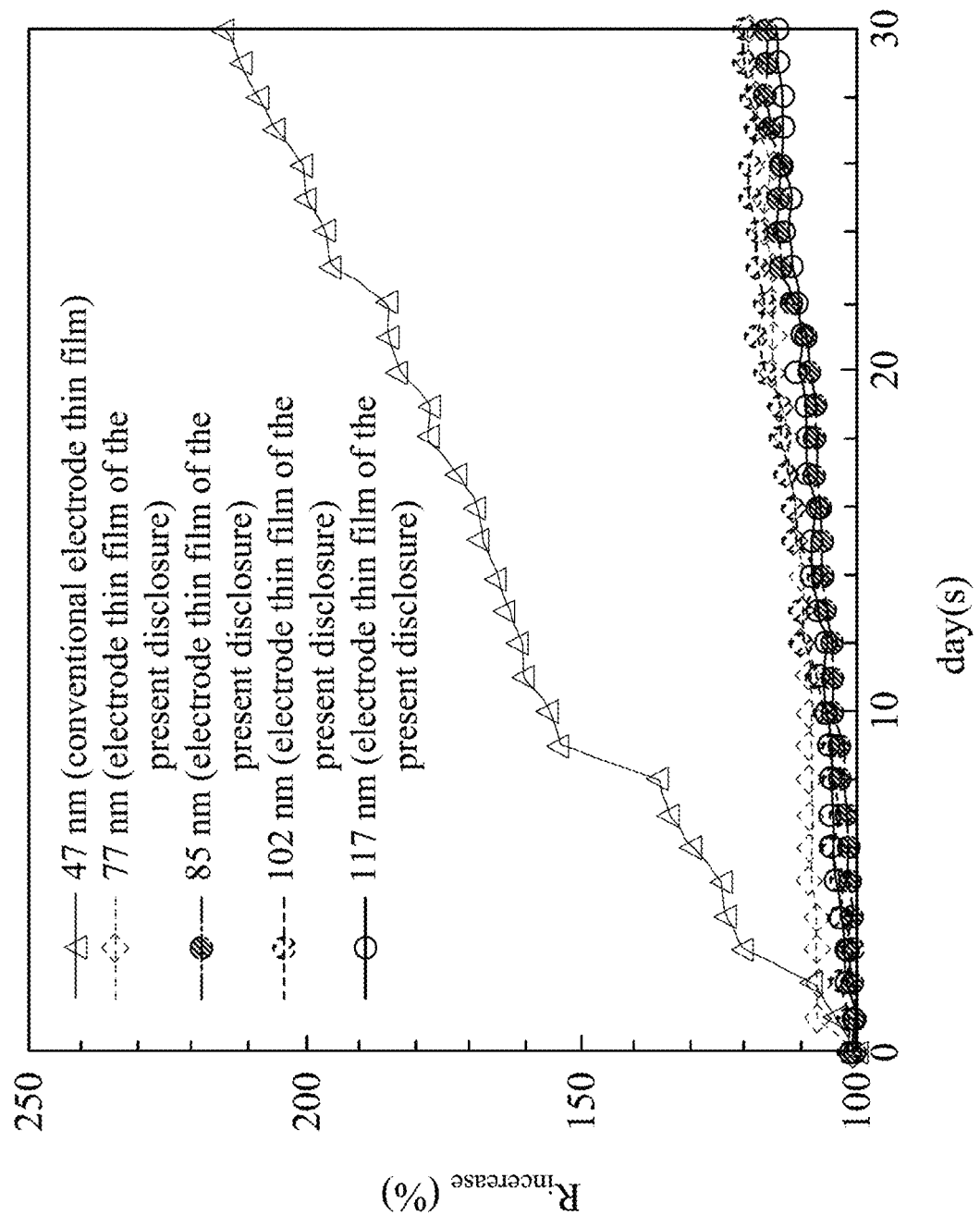
FIG. 12 is a schematic diagram of the stability of the electrode thin film according to an exemplary embodiment of the present disclosure.

See FIG. 12, which is a schematic diagram of the stability of the electrode thin film according to an exemplary embodiment of the present disclosure. In the present embodiment, the horizontal axis represents the number of days of the electrode thin film kept in room temperature and directly contacted with the air, and the vertical axis represents the percentage the sheet resistance increases. As can be observed from FIG. 12, the sheet resistance of the conventional electrode thin film with randomly distributed silver nanowires increases to be 215% after the conventional electrode thin film being kept in room temperature and contacted with the air for 30 days. However, the electrode thin film of the present disclosure merely increases to be about 113%. Accordingly, the electrode thin film of the present disclosure has a better stability and is less probable to lose conductivity for being oxidized to silver oxide in environments with moisture and oxygen. Moreover, it is also difficult for the electrode thin film of the present disclosure to lose conductivity for contacting with sulfide from cars or factories.

Figure 13A:
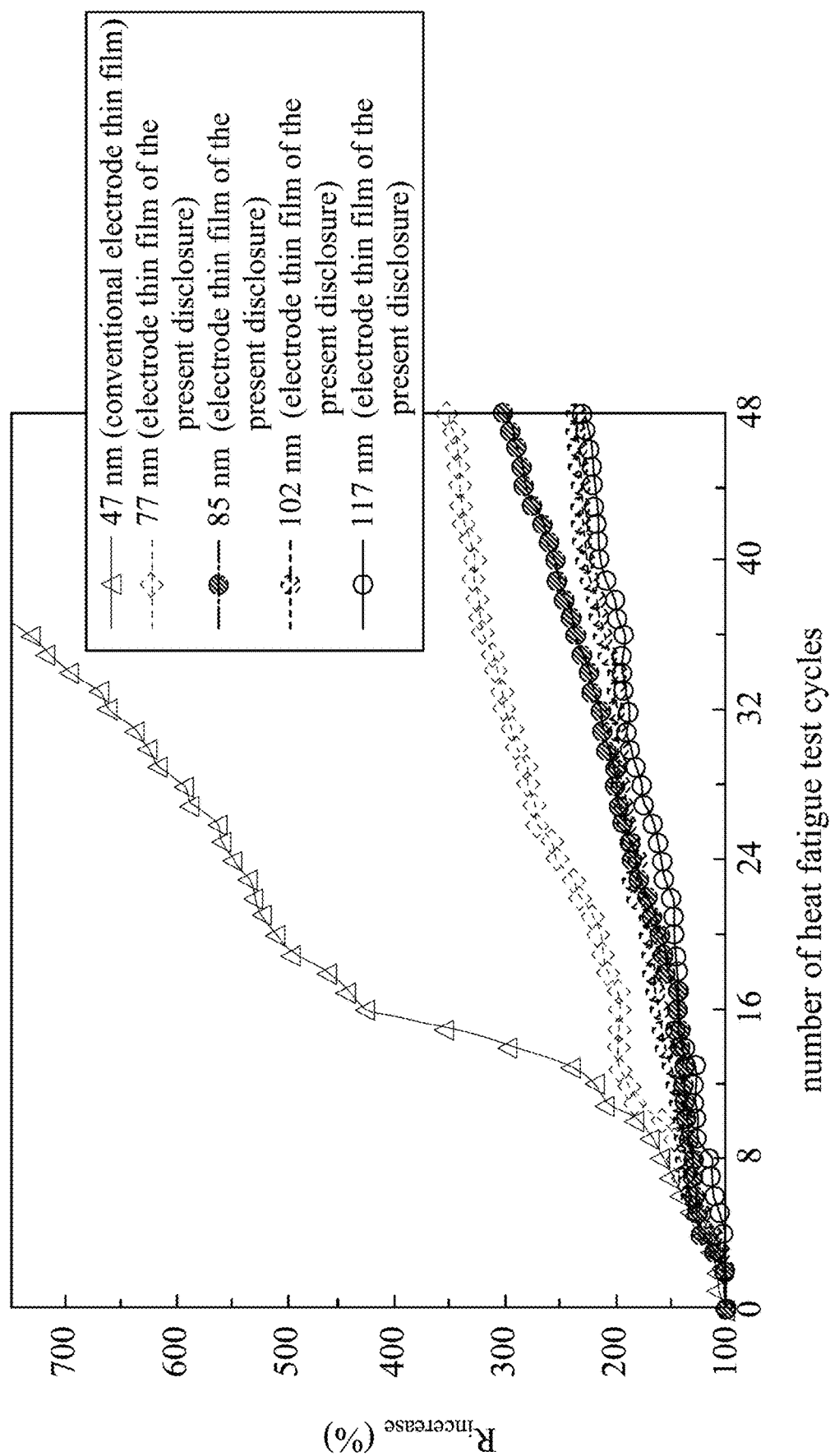
FIG. 13A is a schematic diagram of the characteristic of anti-heat fatigue of the electrode thin film according to an exemplary embodiment of the present disclosure.
Figure 13B:
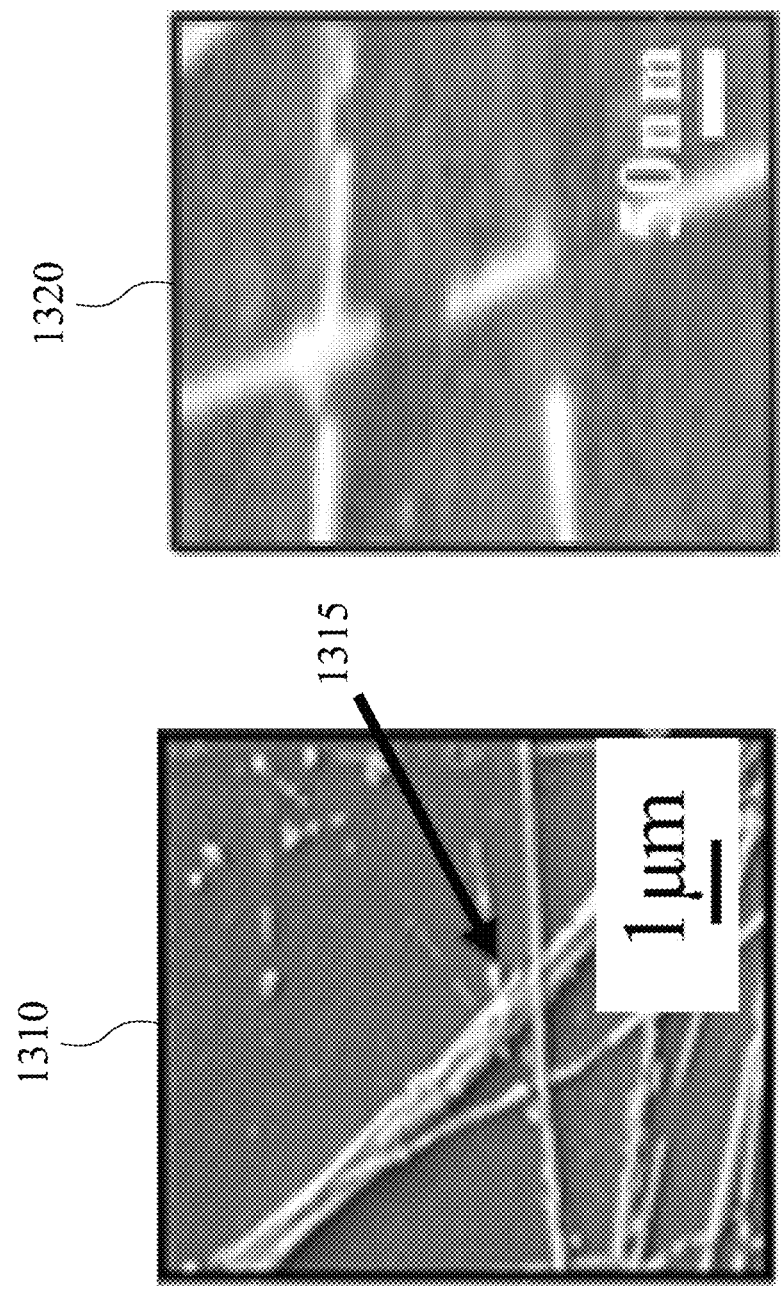
FIG. 13B is a schematic diagram of the silver nanowire network which has experienced the heat fatigue tests according to an exemplary embodiment of the present disclosure.

FIG. 13A is a schematic diagram of the characteristic of anti-heat fatigue of the electrode thin film according to an exemplary embodiment of the present disclosure, and FIG. 13B is a schematic diagram of the silver nanowire network which has experienced the heat fatigue tests according to an exemplary embodiment of the present disclosure. In FIG. 13A, the horizontal axis represents the number of the heat fatigue cycles performed to the electrode thin film, and the vertical axis represents the percentage the sheet resistance increases. In one cycle of the heat fatigue test, the electrode thin film will be placed into a 200° C. oven and heated for 30 minutes, and the electrode thin film will then be cooled down for 5 minutes. As can be observed from FIG. 13A, after 48 cycles of the heat fatigue test, the sheet resistance of the electrode thin film whose thickness is 117 nm of the present disclosure increases to be 228%, and the sheet resistance of the electrode thin film whose thickness is 77 nm of the present disclosure increases to be 352%. However, the sheet resistance of the conventional electrode thin film with randomly distributed silver nanowires increase to be 800% and break after 32 cycles of the heat fatigue test.

In addition, as can be observed from an image 1310 in FIG. 13B, the electrode thin film of the present disclosure can still maintain a bundled structure 1315 after experiencing multiple cycles of the heat fatigue test. However, as can be observed from an image 1320 in FIG. 13B, the silver nanowires in the conventional electrode thin film are broken in the heat fatigue test for not being bundled, and hence the sheet resistance rapidly increases along with the number of the heat fatigue test cycles. Accordingly, the electrode thin film of the present disclosure can sustain high temperatures in the manufacturing process or pressure from chemical materials for being highly resistant to heat fatigue. Moreover, the electrode thin film of the present disclosure is also suitable for optoelectronic components whose temperatures are frequently, repeatedly, and dramatically changed, such as solar cells that frequently, repeatedly, and dramatically changes temperatures in response to the variation of sunlight.

To sum up, the silver nanowires in the electrode thin film proposed in the present disclosure can be aligned and bundled via a single-step coating and the control of the temperature of the substrate, the coating speed, and the height between the roller and the substrate. Besides, via the subsequent water bath method and hot pressing treatment, the sheet resistance and the surface roughness of the electrode thin film can be further reduced. As mentioned before, since the electrode thin film of the present disclosure can be manufactured in environments with low temperature and low pressure, it can be integrated with the roll-to-roll process to implement fast production with low cost. Furthermore, as can be observed from the experimental results in the previous embodiments, the electrode thin film has better sheet resistance, light transmission rate, adhesion to substrate, flexibility, stability, and heat fatigue resistance than conventional electrode thin films. Based on these advantages, the electrode thin film of the present disclosure can be integrated with other composite materials and patterned process in the future to make ideal flexible transparent electrode thin film based on the requirements of applications.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing an electrode thin film, comprising:

determining a height between a first roller and a substrate and a coating speed for the first roller coating a first metal nanowire suspension liquid onto the substrate based on a suspension property of the first metal nanowire suspension liquid;

coating, by using the first roller, the first metal nanowire suspension liquid onto the substrate with the coating speed to form a wetting film on the substrate; and controlling a first temperature of the substrate heating the wetting film based on the suspension property of the first metal nanowire suspension liquid to dry the wetting film as the electrode thin film, wherein the first temperature makes a dewetting speed of the wetting film higher than a drying speed of the wetting film, wherein the height ranges between 0.2 mm and 0.8 mm, the first temperature ranges between 100° C. and 140° C., and the coating speed ranges between 2 cm/s and 10 cm/s.

2. The method for manufacturing the electrode thin film of claim 1, further comprising implementing a water bath method to the electrode thin film to remove a dispersing agent on the electrode thin film, wherein the dispersing agent is polyvinylpyrrolidone.

3. The method for manufacturing the electrode thin film of claim 2, wherein a duration of implementing the water bath method is longer than 30 seconds.

4. The method for manufacturing the electrode thin film of claim 2, further comprising implementing a hot pressing treatment to the electrode thin film to reduce a surface roughness of the electrode thin film.

5. The method for manufacturing the electrode thin film of claim 4, wherein a second temperature of implementing the hot pressing treatment is lower than 120° C., and a pressure of implementing the hot pressing treatment ranges between 100 and 1750 kPa.

6. The method for manufacturing the electrode thin film of claim 1, wherein the first metal nanowire suspension liquid includes silver.

7. The method for manufacturing the electrode thin film of claim 1, further comprising coating, by using a second roller, a second metal nanowire suspension liquid onto the electrode thin film, wherein a first direction of the first roller coating the first metal nanowire suspension liquid is different from a second direction of the second roller coating the second metal nanowire suspension liquid, and both of the first metal nanowire suspension liquid and the second metal nanowire suspension liquid include silver.

8. The method for manufacturing the electrode thin film of claim 1, wherein the first roller is a first rolling rod, and a surface of the first rolling rod is disposed with a plurality of bump structures.

* * * * *